(12) United States Patent
Osborne

(10) Patent No.: US 10,785,149 B2
(45) Date of Patent: Sep. 22, 2020

(54) SYSTEM AND METHOD FOR ADDING ROUTING PATHS IN A NETWORK

(71) Applicant: Level 3 Communications, LLC, Broomfield, CO (US)

(72) Inventor: Eric Osborne, Sutton, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 49 days.

(21) Appl. No.: 16/399,837

(22) Filed: Apr. 30, 2019

(65) Prior Publication Data

US 2019/0342208 A1 Nov. 7, 2019

Related U.S. Application Data

(60) Provisional application No. 62/667,222, filed on May 4, 2018.

(51) Int. Cl.
*H04L 12/741* (2013.01)
*H04L 12/18* (2006.01)

(52) U.S. Cl.
CPC .......... *H04L 45/54* (2013.01); *H04L 12/1886* (2013.01); *H04L 45/745* (2013.01)

(58) Field of Classification Search
None
See application file for complete search history.

(56) References Cited

U.S. PATENT DOCUMENTS

| 7,519,733 | B1* | 4/2009 | Thubert | H04L 12/18 709/232 |
| 2013/0322437 | A1* | 12/2013 | Raszuk | H04L 45/04 370/389 |
| 2016/0234112 | A1* | 8/2016 | Anand | H04L 45/64 |

* cited by examiner

*Primary Examiner* — Rebecca E Song

(57) ABSTRACT

Aspects of the present disclosure involve systems, methods, computer program products, and the like, for generating a routing table. In one implementation, BGP route broadcasts are received by a control plane of a network. The BGP route broadcasts are aggregated into a table of address summarized routes based on IP addresses included in the BGP route broadcasts. A table of attribute summarized routes is generated from the table of address summarized routes based on similarities between attributes included in the address summarized routes.

20 Claims, 5 Drawing Sheets

SYSTEM AND METHOD FOR ADDING ROUTING PATHS IN A NETWORK

CROSS REFERENCE TO RELATED APPLICATION

This application is related to and claims priority under 35 U.S.C. § 119(e) from U.S. Patent Application No. 62/667,222, filed May 4, 2018 entitled "System and Method for Adding Routing Paths in a Network," the entire contents of which is incorporated herein by reference for all purposes.

TECHNICAL FIELD

Embodiments of the present invention generally relate to systems and methods for implementing a telecommunications network, and more specifically for generating routing tables for a telecommunications network.

BACKGROUND

Network traffic is typically managed by routers that forward data packets through the network according to routing tables received and maintained by a control plane. Routing tables often include hundreds of thousands or millions of entries denoting routing paths through the network for traffic directed to particular addresses. Many routers are unable to directly store large routing tables. In some cases, redundant devices are used to address space limitations. In other cases, expanded memory components may be used, but that can slow traffic forwarding due to requiring more complicated routing table lookup procedures. However, if table size could be reduced while allowing for correct forwarding of network traffic, the need for redundant devices or expanded memory components may be lessened.

It is with these observations in mind, among others, that aspects of the present disclosure were concerned and developed.

SUMMARY

In a first embodiment of the invention, a method for generating a routing table includes receiving multiple routing information broadcasts, the routing information broadcasts including an Internet Protocol (IP) address, a mask value, and metadata, generating an address summarized table by comparing IP addresses and mask values between the multiple routing information broadcasts, the address summarized table including contiguous IP address and corresponding mask values, and generating an attribute summarized table by comparing metadata between address summarized table entries, the attribute summarized table including address summarized table entries having identical portions of metadata.

In one embodiment, the metadata comprises one of a local preference, an autonomous system (AS) path length, an AS path, or a multiple exit discriminator (MED).

In one embodiment, the method further includes forwarding a packet based through a network on the attribute summarized table.

In one embodiment, the routing information broadcasts comprises one or more border gateway protocol (BGP) broadcasts.

In one embodiment, the BGP broadcasts are received by one or more route reflectors comprising a data plane for a network.

In one embodiment, a route reflector receives the routing information broadcasts, and the method includes storing the attribute summarized table on a router.

In one embodiment, multiple routers store respective copies of the attribute summarized table, each respective copy of the attribute summarized table including interface identifiers for forwarding packets across a network.

DETAILED DESCRIPTION

Aspects of the present disclosure involve systems, methods, computer program products, and the like, for generating a routing table of summarized IP addresses in a telecommunications network. In general, the process allows for addresses intended for a routing table to be grouped based on similarities between the addresses themselves as well as between metadata associated with each address. More particularly, a control plane of a network is able to receive border gateway protocol (BGP) routes, in the form of IP addresses coupled to metadata. Further, the control plane may summarize the received routes and place them in a routing table according to the combined address and metadata groupings. The routing table may be used by the control plane to orchestrate forwarding packets directed to the summarized IP addresses by routers and other components within the network. By summarizing the addresses using the IP address information as well as the metadata, routing tables maintained within the network can be greatly reduced in size. In some cases, the reduced size of the routing table may allow routers or other components to maintain the entirety of the table in memory where they would otherwise be unable to fit a functional routing table due to space limitations.

Figure 1:
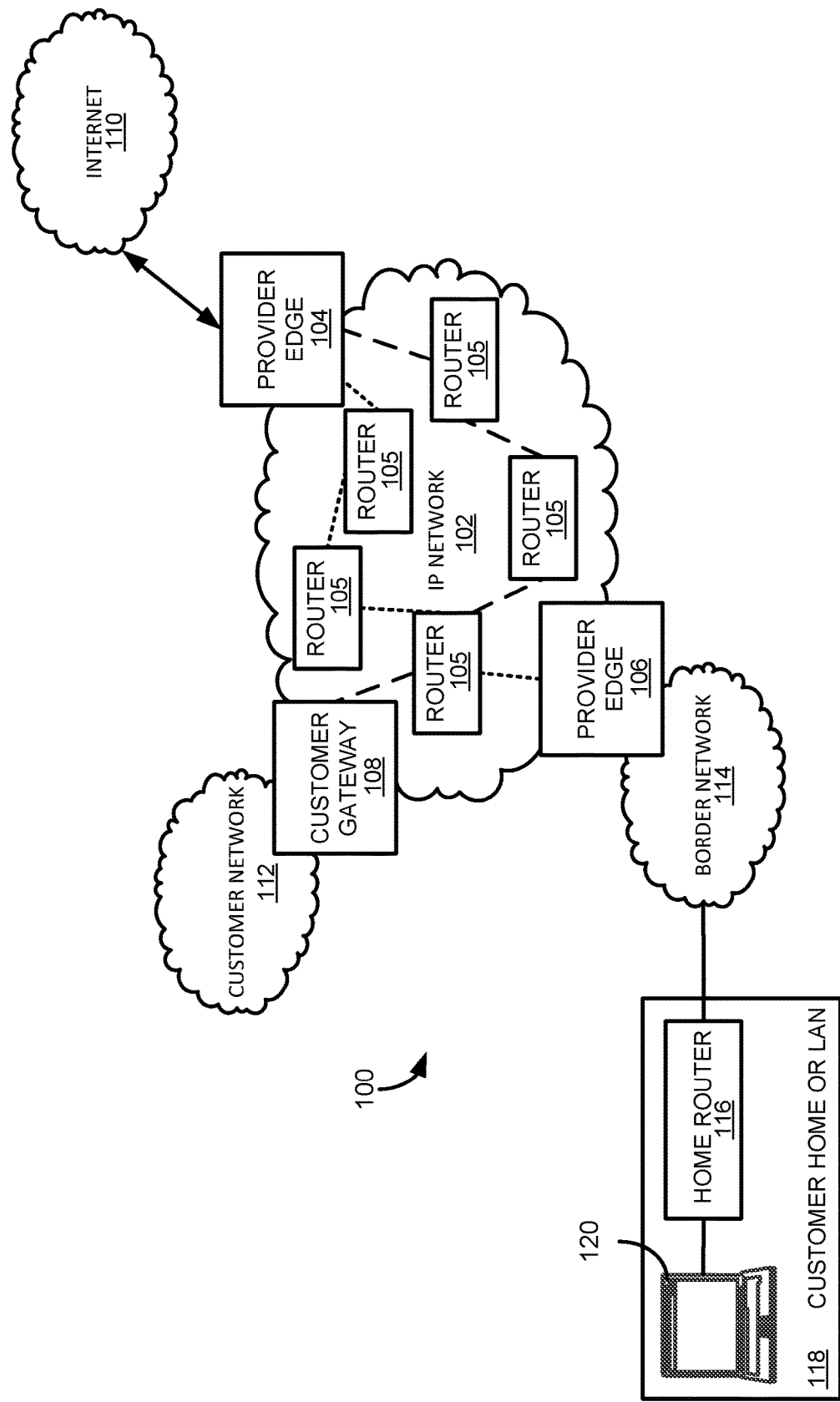
FIG. 1 is a schematic diagram illustrating an exemplary Internet Protocol (IP) operating environment, in accordance with one embodiment of the present disclosure, in accordance with various embodiments of the present technology.

FIG. 1 illustrates an example of an operating environment 100 for a telecommunications network receiving BGP routes from client devices of the network and utilizing those routes to transfer data through the telecommunications from one network terminus to another. In general, the environment 100 provides for establishing communication sessions between network user devices (e.g., computers, smartphones, mobile devices, tablets, etc.) and for providing one or more network services to network user devices. As depicted in FIG. 1, the environment 100 includes an IP network 102, which may be provided by a wholesale network service provider. In some examples, portions of the network may include non-IP based routing in addition to, or instead of, the IP network 102. In general, the network 102 of FIG. 1 may include any communication network devices known or hereafter developed.

The IP network 102 includes various components such as, without imputing limitation, gateways, routers, registrars, and abstraction layers such as control planes and data planes, and the like which will be readily understood to be included by a person having ordinary skill in the art. With specific reference to FIG. 1, the IP network 102 includes multiple routers 105 for internally managing network traffic between network endpoints. A packet received by the network will be forwarded from one router 105 to another router 105 according to a pre-determined routing table. The routing table provides forwarding information for each router 105 and is stored by each router 105 in memory. The routing table of a given router 105 allows the router 105 to identify, based on the destination of a received packet, to which next router 105 to forward the received packet along a transmission route through the network. In some examples, the router table can take up the significant majority or all of the storage memory of a router 105.

A customer network 112 can include various communications devices such as, without imputing limitation, routers, personal computers, telephones, and the like, as will be apparent to a person having ordinary skill in the art. As such, although discussed herein as pertaining to "routers", it should be appreciated that the methods and systems described may also apply to the other components of the network. The customer network 112 can connect to the IP network 102 through a customer gateway 108. The customer gateway 108 can be, without imputing limitation, any or multiple of various communications devices such as a modem, a secondary network, a network bridge, and the like. The customer gateway 108 will enable a customer network 112 to communicate with another customer network 112, such as a border network 114 including a customer home or local area network (LAN) 118, or the Internet 110. Communications sent from the customer network 112 may traverse, or route through, the IP network 105 via forwarding between the routers 105. For example, as depicted in FIG. 1, communications from the customer network 112 to the Internet 110 can route through the routers 105 according to the dashed line connecting the customer gateway 108 to a provider edge 104 across the said routers.

The customer home or LAN 118 may include communications device 120 and a home router 116. Although depicted here as a computer, the communications device 120 can be any type of communications devices that receives a multimedia signal, such as an audio, video, or web-based signal, and presents that signal for use by a user of the communications device. For example, the customer home or LAN 118 can include a smartphone, tablet, edge device, and the like. The home router 116 may manage and/or facilitate communications between the customer home or LAN 118 and other devices over the IP network 102, such as the customer network 112 and/or the Internet 110.

The customer home or LAN 118 typically connects to the IP network 102 via a border network 114, such as one provided by an Internet Service Provider (ISP). The border network 114 is typically provided and maintained by a business or organization such as a local telephone company or cable company. The border network 114 can provide network and communications related services to their customers. In contrast, the customer gateway 108 accesses the IP network 102 directly. Communication via any of the networks can be wired, wireless, or a combination of the two. Additionally, the border network 114 may connect to the Internet 110 through a provider edge 106, 104.

Figure 2:
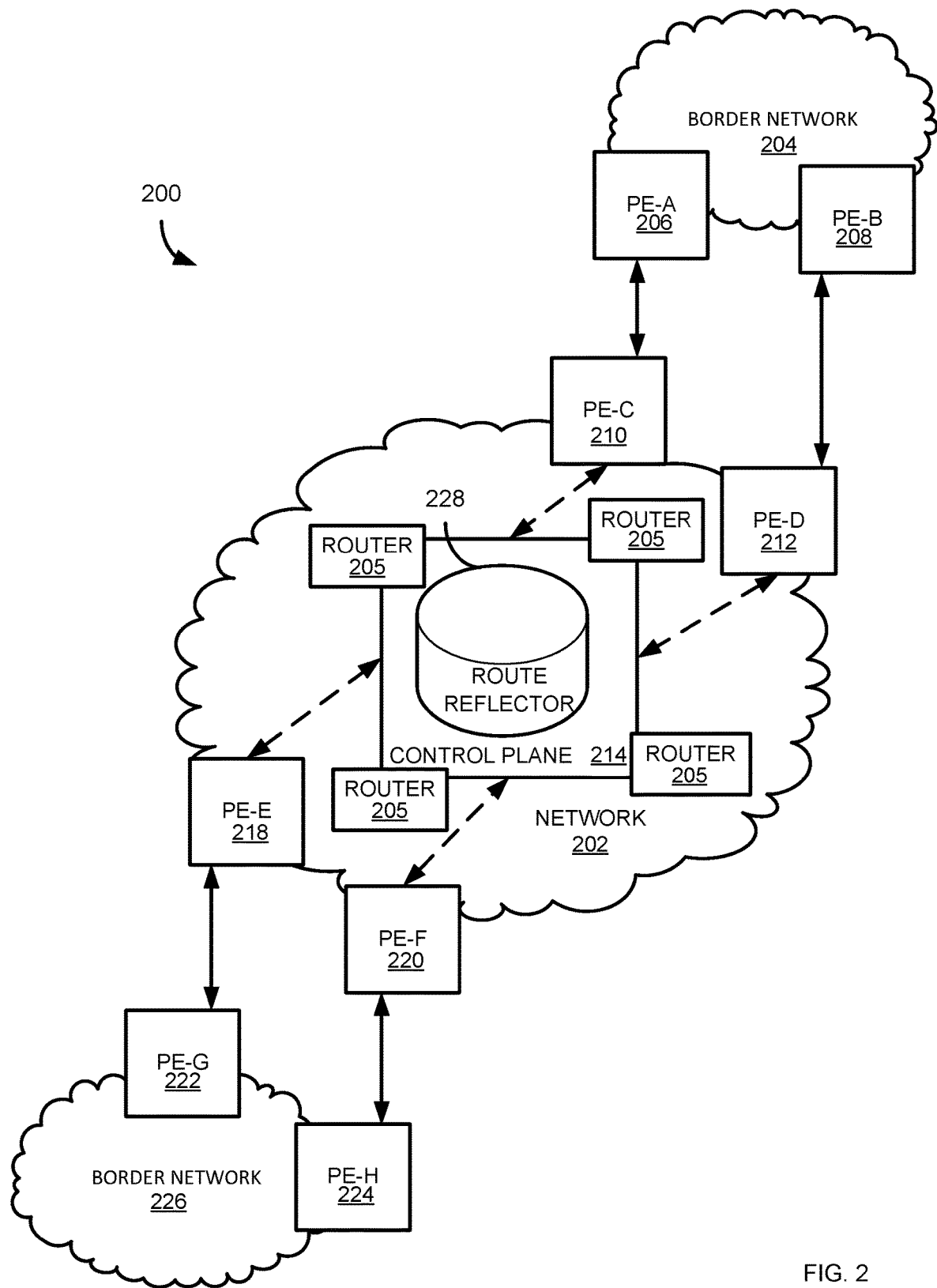
FIG. 2 is a schematic diagram illustrating a network environment to provide multiple routes to a client network through the network environment, in accordance with various embodiments of the present technology.

As mentioned above, the telecommunications network may allow a customer to connect to the network through a provider edge 132. In some instances, a customer network may connect to the telecommunications network through more than one provider edge device. In particular, FIG. 2 is a schematic diagram illustrating a network environment 200 including multiple routes for a border network 204, 226 through the network environment. The telecommunications network 202 of FIG. 2 may be similar to that of FIG. 1 such that the networks may include the same or similar components. Further, border networks 204, 226 connected to the telecommunications network 202 can utilize the network to send and receive packets of information to/from other border networks, client networks, and/or other connected networks such as client networks, provider networks, and the like.

As shown in FIG. 2, a border network 204 includes a provider edge A 206 and provider edge B 208. The border network 204 connects to the network 202 through the provider edge A 206 and the provider edge B 208. Where the border network 204 connects through provider edge A 206, a reciprocal provider edge C 210 of the network 202 may complete the connection. Likewise, where the border network 204 connects to the network 202 through provider edge B 208, a reciprocal provider edge D 212 of the network 202 may complete the connection. While the provider edges are depicted here connecting through individual reciprocating provider edges, it is understood that two or more provider edges may connect to the network 202 through a single counterpart provider edge and that, likewise, a single provider edge may connect to the network 202 through multiple counterpart provider edges of the network 202.

The network 202 can include a control plane 214 which may communicate with provider edges C-F 210, 212, 218, 220 of the network 202. The control plane 214 can determine routing and data flow policies which will be carried out by routers 205 of the network 202. The control plane 214 can broadcast the policies out to routers 205 via a route reflector 228 included in the control plane 214. In one particular embodiment, the control plane 214 may also generate a routing table and the like. The route reflector 228 may communicate with some or all of the routers 205 in order to distribute the generated routing table. The control plane 214 can include various software and hardware interfaces, communications devices, and other elements as will be apparent to a person having ordinary skill in the art.

The control plane 214 may receive routing information in the form of Border Gateway Protocol ("BGP") route broadcasts from provider edges C-F 210, 212, 218, 220 of the network 202. The provider edges C-F 210, 212, 218, 220 may in turn have received the BGP route broadcast from associated provider edges A 206, B 208, G 222, and H 224. In one particular configuration, the control plane 214 may relay the received BGP route broadcasts to the route reflector 228 for entry into the routing table. Once the route reflector 228 has generated or updated the routing table, the route reflector 214 may broadcast the new routing table to one or more of the routers 205.

Although a single route reflector 228 is depicted within the control plane 214, it is understood that the control plane 214 can include multiple route reflectors and/or other devices for drawing and managing a topology of the network 202, as will be apparent to a person having ordinary skill in the art. For example, specialized devices along with multiple route reflectors can make up a control plane in order to provide redundant, and thus fault tolerant, dissemination of routing tables and/or dynamic traffic shaping based on routing tables and real-time traffic loads across the network 202.

Figure 3:
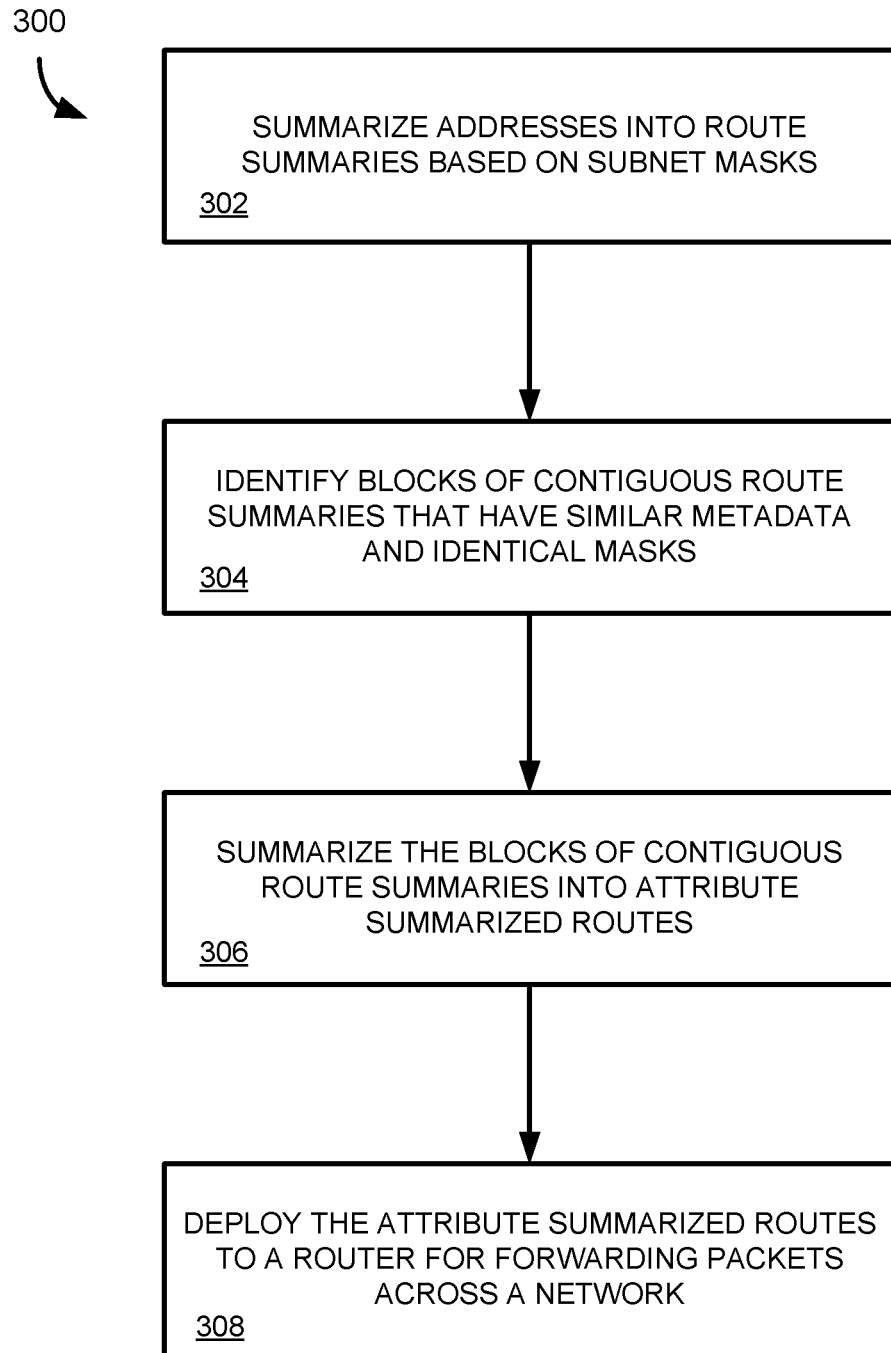
FIG. 3 is a flowchart illustrating a method for populating a routing table with summarized IP addresses, in accordance with various embodiments of the present technology.

In one example, the router reflector 228 may generate the routing table according to a method 300 depicted by FIG. 3. Specifically, FIG. 3 and FIG. 4 respectively depict a method 300 for generating a sequence 400 of summarized routing tables to culminate in an attribute summarized table 406 which may be substantially reduced in size from an address summarized routing table 404 and/or an un-summarized routing table 402. Each of routing tables 402, 404, and 406 include destination addresses 450A associated with respective route information 450B. Route information 450B may include an IP address, microservice identifier, name, or other interface for directing messages towards respective destination addresses 450A. Here, route information 450B includes four interfaces TI₁-TI₄, which may be associated with multiple destination addresses.

In particular, the unsummarized routing table 402 includes a raw listing of all destination addresses received by the route reflector 228. While the unsummarized routing table 402 is discussed in the context of being received by the route reflector 228, it is understood that any component, within the IP network 102 or the network 202, that maintains a routing table or is configured to manage a routing table can perform the method 300 when it receives or requests BGP routes. Thus, in one example where the network 202 does not include a route reflector 228, each component which receives BGP route broadcasts and/or stores the received BGP route broadcasts may also perform the method 300 for reducing the size of the routing table.

Figure 4:
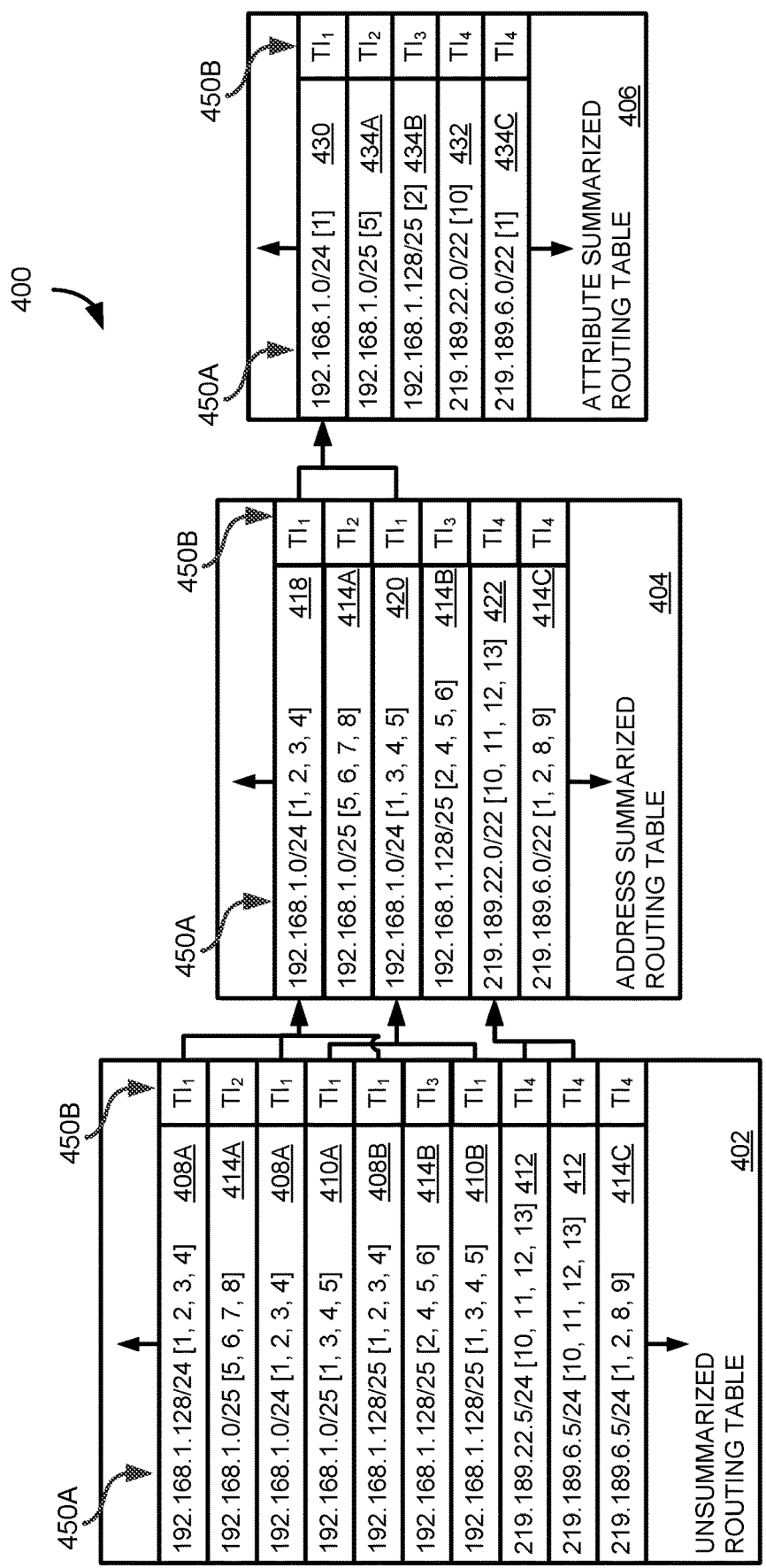
FIG. 4 is a diagram illustrating summarized routing tables, in accordance with various embodiments of the present technology.

Routes and/or addresses may be summarized by one or more devices, real or virtual, within the control plane 214. Here, the route reflector 228 may summarize addresses received as BGP route broadcasts into route summaries based on subnet masks included in the received broadcast (operation 302). In general, BGP route addresses can be summarized into a single routing table entry when each BGP route address has a similar IP address value, mask value, and metadata. As depicted in FIG. 4, BGP route addresses 408A-B each include similar mask values (e.g., "/24" and "/25"). A mask value represents a count of sequential bits set to "1" that can be applied to an address in a bitwise "AND" operation. For example, a mask of 24 includes 24 "1"s in sequence to be applied to an associated, or "masked", value. BGP route addresses 408A-B may further include identical metadata "[1, 2, 3, 4]" which represents a path through an autonomous system ("AS").

Though FIG. 4 depicts metadata including only an AS path, it is understood that other metadata may be likewise included and used as discussed herein such as, without imputing limitation, a local preference, an AS path length, a multiple exit discriminator ("MED"), and other data, as will be apparent to a person of ordinary skill in the art. For example, BGP route addresses can further, or instead, be summarized based on a local preference which denotes a preferred entry point into a target network. Similarly, a path length, which is a count of the number of paths within a respective AS path, may be used as a basis for summarization. While the AS paths depicted in FIG. 4 each include a path length of "4" (e.g., each AS path metadata includes four values or hops), it is understood that a BGP route broadcast may include longer paths, shorter paths, or paths of varying length. Likewise, a MED value may be used for summarization purposes and can include a metric assigning a score to each of multiple exits from a first network into a second another network (e.g., the lower the score, the more preferable the exit). For sake of clarity, only AS path metadata is depicted and discussed below, though it is understood that any and various metadata elements of a BGP route broadcast may be utilized for BGP address summarization by attributes as described below.

The BGP route addresses include IP addresses which may be demarcated by multiple "." characters interspersed throughout each IP address. These demarcated sections of the IP address are commonly referred to as octets and each octet may be represented as a binary or decimal number. When in binary form, each octet includes eight bits each having a value of "1" or "0". When masked by a mask value, octet values may be preserved or modified based on the mask value. As depicted in FIG. 4, BGP route addresses 408A-B include IP addresses "192.168.1.128" and "192.168.1.0" which may be respectively converted into binary forms "11000000.10101000.00000001.10000000" and "11000000.10101000.00000001.00000000". When each respective mask is applied to each respective IP address of 408A-B, as described below in Table 1, the resultant values (e.g., the masked addresses) differ only by the largest bit in the rightmost octet and are thus contiguous addresses.

TABLE 1

| 408A: | |
|---|---|
| 11000000.10101000.00000001.10000000 | 192.168.1.128 |
| AND | AND |
| 11111111.11111111.11111111.00000000 | 24 |
| 11000000.10101000.00000001.00000000 | 192.168.1.0 |
| 11000000.10101000.00000001.00000000 | 192.168.1.0 |
| AND | AND |
| 11111111.11111111.11111111.00000000 | 24 |
| 11000000.10101000.00000001.00000000 | 192.168.1.0 |
| 408B: | |
| 11000000.10101000.00000001.10000000 | 192.168.1.128 |
| AND | AND |
| 11111111.11111111.11111111.10000000 | 25 |
| 11000000.10101000.00000001.10000000 | 192.168.1.128 |

Further, BGP route addresses 408A-B include identical metadata "[1, 2, 3, 4]" and so may be summarized into an address summarized BGP route address 418 on the address summarized routing table 404. The summarized BGP route address 418 includes an IP address of "192.168.1.0" and mask value of "/24". In comparison, BGP route addresses 410A-B include contiguous masked addresses to BGP route addresses 408A-B when mask values are applied to respective IP addresses as above. However, BGP route addresses 410A-B each include metadata "[1, 3, 4, 5]" and thus cannot be summarized with BGP route addresses 408A-B and are instead summarized into an address summarized route address 420 according to the process discussed above. The summarized route address 420 includes the masked address "192.168.1.0" and mask value "/24" along with metadata "[1, 3, 4, 5]".

As depicted in FIG. 4, BGP route addresses 412 include IP addresses "219.189.22.5" and "219.189.6.5" along with identical mask values "/24" and metadata "[10, 11, 12, 13]". Accordingly, the BGP route addresses 412 can be summarized as discussed above and entered into the address summarized routing table 404 as summarized route address 422. The summarized route address 422 includes the masked address "219.189.22.0/22" and masked value "/22" along with metadata "[10, 11, 12, 13]".

In some cases BGP address routes may not be summarizable at this point. BGP address routes 414A-C are examples of such unsummarizable BGP address routes. BGP address routes 414A-B include IP addresses and mask values which may be contiguous to each other and BGP address routes 408A-B. However, BGP address routes 414A-B include respective metadata "[5, 6, 7, 8]" and "[2, 4, 5, 6]". Likewise, while the BGP broadcast route 414C would otherwise be contiguous and summarizable with BGP broadcast routes 412, the included metadata "[1, 2, 8, 9]" causes it to be unsummarizable. The unsummarizable BGP broadcast routes are entered into the address summarized routing table 404 directly as summarized route addresses 414 containing substantially identical values to their unsummarized counterparts (e.g., BGP route addresses 414A-C) on the unsummarized routing table 402.

Having summarized the BGP address routes into the address summarized routing table 404, the route reflector 228 may identify and/or sort into blocks contiguous summarized address routes having similar metadata and identical mask values (operation 304). As discussed above, address summarized routes are contiguous where each route includes identical values in each octet except for the rightmost where either, when in binary form, the leftmost bit is the only differentiating value or all values are identical.

As depicted in FIG. 4, the address summarized routes 418, 420, 414A, and 414B are contiguous. However, only summarized address routes 418 and 420 include identical mask values (e.g., "/24"). Further, the address summarized routes 418 and 420 include metadata "[1, 2, 3, 4]" and "[1, 3, 4, 5]" respectively. In particular, the route reflector 228 can group the contiguous address summarized routes 418 and 420 based on the identical first value in the respective metadata (e.g., "1") and/or the fact that the majority of each respective metadata overlaps (e.g., "1", "3", and "4" are included in the metadata of both address summarized routes).

In comparison, the route reflector 228 will not group the address summarized routes 414A-B. While the address summarized routes 414A-B are contiguous and include identical mask values, the respective metadata of each includes different first values (e.g., "5" and "2") and/or does not include majority overlapping metadata. Likewise, address summarized routes 422 and 414C are contiguous and each includes the same mask value but also each includes altogether different metadata from each other. Accordingly, the route reflector 228 will not group the address summarized routes 422 and 414C.

The route reflector 228 may summarize the identified blocks of contiguous address summarized routes into attribute summarized routes entered onto the attributed summarized routing table 406 (operation 306). In one example, the attribute summarized routes may include abbreviated or truncated metadata. In other examples, the attribute summarized routes may include other amalgamated forms of the metadata of the summarized address routes contributing to each respective entry such as concatenated metadata, averaged metadata, and the like.

As depicted in FIG. 4, the route reflector 228 may summarize the address summarized routes 418 and 420 as an attribute summarized route 430. The attribute summarized route 430 includes the same address and mask value of the address summarized routes 418 and 420 (e.g., "192.168.1.0" and "/24"). However, the attribute summarized route 430 includes only the first shared value of the address summarized routes 418 and 420 (e.g., "[1]").

In comparison, the address summarized routes 414A-C, 420, and 422 are individually entered into the attribute summarized routing table 406 in respectively truncated form. The address summarized route 414A is stored in the attribute summarized routing table 406 as an attributed summarized route 434A including a truncated metadata value of "[5]". The address summarized route 434B is stored in the attribute summarized routing table 406 as an attribute summarized route 434B including a truncated metadata value of "[2]". The address summarized route 422 is stored in the attribute summarized routing table 406 as an attribute summarized route 432 including a truncated metadata value of "[10]". The address summarized route 414C is stored in the attribute summarized routing table 406 as an attribute summarized route 434C including a truncated metadata value of "[1]".

Having generated the attribute summarized routing table 406, the route reflector 228 may deploy the attribute summarized routes to the routers 205 so they can forward packets across the network 202 accordingly (operation 308). In particular, the routers 205 may each store a copy of the attribute summarized routing table 406 in memory. In some examples, the routers 205 may modify the attribute summarized routing table 406 into a forwarding table or similar form for rapid use and access. In some examples, the route reflector 228 may pass the attribute summarized routing table 406 to interim devices within the control plane 214 before the receipt by the routers 205. The routers 205 may then use the attribute summarized routing table 406, in received or modified form, to forward packets received by the network 202 as depicted in FIG. 1 with regards to routers 105 and IP network 102.

Figure 5:
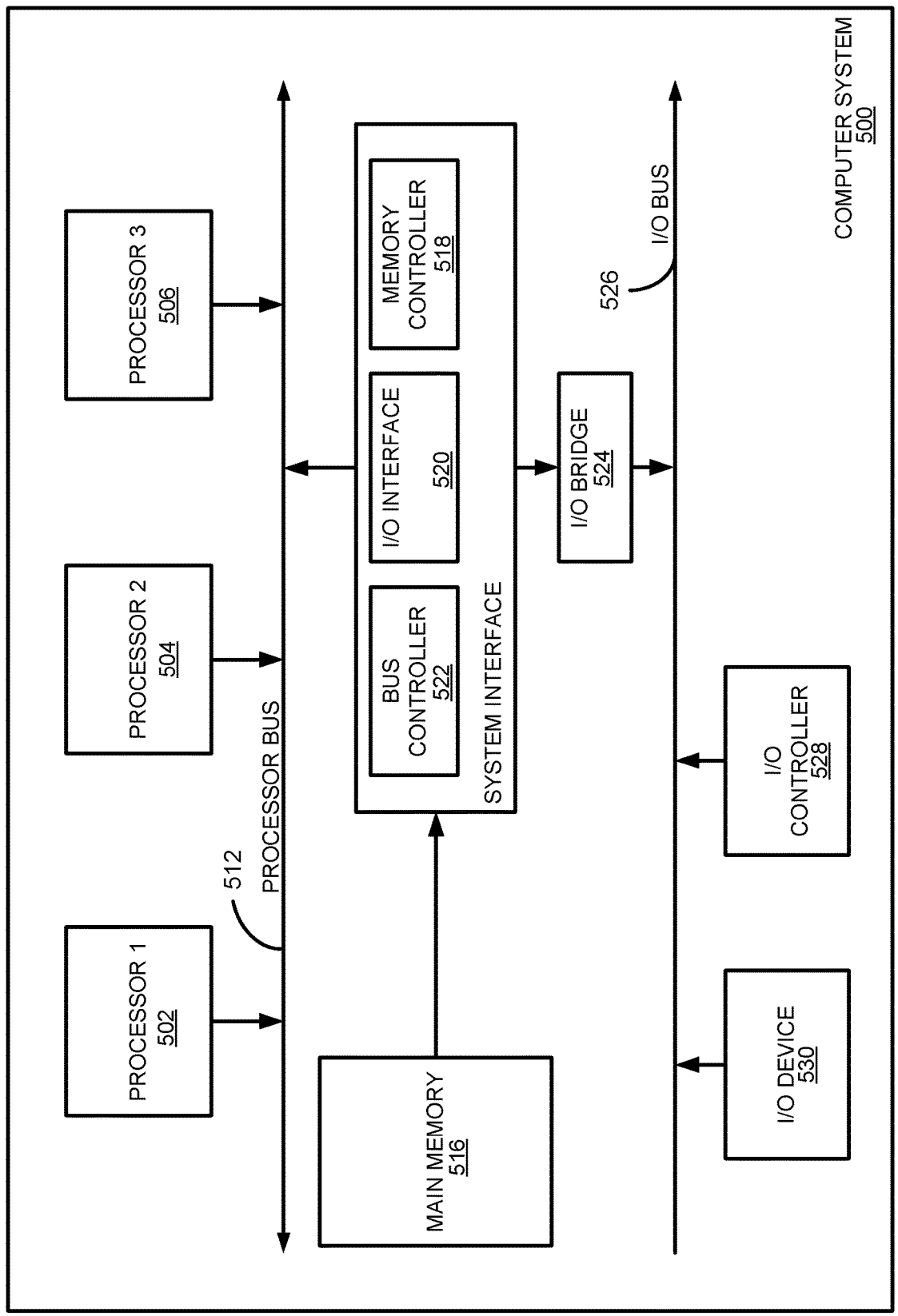
FIG. 5 is a diagram illustrating an example of a computing system which may be used in implementing various embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the provider edge device discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

I claim:

1. A method for generating a routing table, the method comprising:
    receiving a plurality of routing information broadcasts, the routing information broadcasts comprising an Internet Protocol (IP) address, a mask value, and metadata;
    generating an address summarized table by comparing IP addresses and mask values between the multiple routing information broadcasts, the address summarized table comprising contiguous IP address and corresponding mask values; and
    generating an attribute summarized table by comparing metadata between address summarized table entries, the attribute summarized table comprising address summarized table entries having identical portions of metadata.

2. The method of claim 1, wherein the metadata comprises one of a local preference, an autonomous system (AS) path length, an AS path, or a multiple exit discriminator (MED).

3. The method of claim 1, further comprising forwarding a packet through a network based on the attribute summarized table.

4. The method of claim 1, wherein generating the attribute summarized table further comprises comparing a respective metadata value of each address summarized table entry and grouping entries having identical metadata values.

5. The method of claim 4, wherein the routing information broadcasts comprises one or more border gateway protocol (BGP) broadcasts received by one or more route reflectors comprising a data plane for a network.

6. The method of claim 1, wherein a route reflector receives the routing information broadcasts, and further comprising storing the attribute summarized table on a router.

7. The method of claim 6, wherein multiple routers store respective copies of the attribute summarized table, each respective copy of the attribute summarized table including interface identifiers for forwarding packets across a network.

8. The method of claim 1, wherein entries of the attribute summarized table each comprise a summarized address entry associated with a respective interface for forwarding packets.

9. A system for generating a routing table, the system comprising:
    one or more processors; and
    a memory storing instructions to:
        receive a plurality of routing information broadcasts, the routing information broadcasts comprising an Internet Protocol (IP) address, a mask value, and metadata;
        generate an address summarized table by comparing IP addresses and mask values between the multiple routing information broadcasts, the address summarized table comprising contiguous IP address and corresponding mask values; and
        generate an attribute summarized table by comparing metadata between address summarized table entries, the attribute summarized table comprising address summarized table entries having identical portions of metadata.

10. The system of claim 9, wherein the metadata comprises one of a local preference, an autonomous system (AS) path length, an AS path, or a multiple exit discriminator (MED).

11. The system of claim 9, wherein the memory stores further instructions to forward a packet based through a network on the attribute summarized table.

12. The system of claim 9, wherein the routing information broadcasts comprises one or more border gateway protocol (BGP) broadcasts that are received by one or more route reflectors comprising a data plane for a network.

13. The system of claim 9, wherein entries of the attribute summarized table each comprise a summarized address entry associated with a respective interface for forwarding packets.

14. The system of claim 9, wherein a route reflector receives the routing information broadcasts, and the memory stores further instructions to store the attribute summarized table on a router.

15. The method of claim 14, wherein multiple routers store respective copies of the attribute summarized table, each respective copy of the attribute summarized table including interface identifiers for forwarding packets across a network.

16. A method for generating a routing table, the method comprising:
receiving multiple routing information broadcasts, the routing information broadcasts comprising an Internet Protocol (IP) address, a mask value, and metadata;
performing bitwise AND operations between respective IP addresses and a series of bits based on the mask values to identify identical IP address portions between IP addresses;
identifying contiguous IP addresses from the IP addresses including identical address portions based on a rightmost bit for each respective IP address including identical address portions;
generating an address summarized table by aggregating the contiguous IP addresses into respective single address summarized entries, the address summarized table comprising address summarized IP addresses, respective mask values, and respective metadata;
comparing attributes of the address summarized IP addresses to identify address summarized IP addresses associated with respective metadata having identical portions with each other; and
generating an attribute summarized table by aggregating the identified address summarized IP addresses into single attribute summarized entries, the attribute summarized table comprising attribute summarized IP addresses, respective mask values and a respective portion of the respective metadata.

17. The method of claim 16, wherein the metadata comprises one of a local preference, an autonomous system (AS) path length, an AS path, or a multiple exit discriminator (MED).

18. The method of claim 16, wherein at least one of the address summarized table or the attribute summarized tables includes respective interface values associated with each table entry, the interface values indicating a forwarding interface for routing packets across a network.

19. The method of claim 18, further comprising forwarding a packet based through the network based on the interface values of the attribute summarized table.

20. The method of claim 18, wherein a route reflector receives the routing information broadcasts, the method further comprising storing the attribute summarized table on a router.

* * * * *